United States Patent
Smith et al.

(10) Patent No.: US 7,103,612 B2
(45) Date of Patent: Sep. 5, 2006

(54) INSTANTIATION OF OBJECTS FOR INFORMATION-SHARING RELATIONSHIPS

(75) Inventors: Wayne E. Smith, Palo Alto, CA (US); Jing Liu, Pacifica, CA (US); James Stamos, Saratoga, CA (US); Mahesh Subramaniam, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 363 days.

(21) Appl. No.: 10/400,225

(22) Filed: Mar. 26, 2003

(65) Prior Publication Data

US 2004/0034669 A1 Feb. 19, 2004

Related U.S. Application Data

(63) Continuation-in-part of application No. 10/308,924, filed on Dec. 2, 2002, now Pat. No. 6,889,231, and a continuation-in-part of application No. 10/308,879, filed on Dec. 2, 2002, now Pat. No. 6,762,872, and a continuation-in-part of application No. 10/308,851, filed on Dec. 2, 2002.

(60) Provisional application No. 60/410,883, filed on Sep. 13, 2002, provisional application No. 60/400,532, filed on Aug. 1, 2002.

(51) Int. Cl.
*G06F 17/30* (2006.01)

(52) U.S. Cl. ................. 707/103 R; 707/100; 707/101; 707/102; 707/104.1

(58) Field of Classification Search ................ 707/102, 707/103 R, 104.1, 100, 101; 717/108; 719/330, 719/315, 318

See application file for complete search history.

(56) References Cited

U.S. PATENT DOCUMENTS

| | | | |
|---|---|---|---|
| 4,007,450 A | | 2/1977 | Haibt et al. |
| 5,473,696 A | | 12/1995 | van Breemen et al. |
| 5,604,900 A | | 2/1997 | Iwamoto et al. |
| 5,613,134 A | * | 3/1997 | Lucus et al. ................. 715/526 |
| 5,652,888 A | * | 7/1997 | Burgess ....................... 719/318 |
| 5,680,619 A | * | 10/1997 | Gudmundson et al. ..... 717/108 |
| 5,715,413 A | * | 2/1998 | Ishai et al. ................... 715/825 |
| 5,758,083 A | | 5/1998 | Singh et al. |
| 5,948,062 A | | 9/1999 | Tzelnic et al. |
| 6,163,813 A | * | 12/2000 | Jenney ........................ 719/315 |
| 6,169,988 B1 | | 1/2001 | Asakura |
| 6,222,840 B1 | | 4/2001 | Walker et al. |
| 6,405,209 B1 | * | 6/2002 | Obendorf ................. 707/103 R |

(Continued)

OTHER PUBLICATIONS

International Searching Authority, "Notification of Transmittal of the International Search Report or the Declaration," dated May 25, 2004, 6 pages.

(Continued)

*Primary Examiner*—Frantz Coby
(74) *Attorney, Agent, or Firm*—Hickman Palermo Truong & Becker LLP

(57) ABSTRACT

A method and system are provided for instantiating objects for participation in information sharing relationships. According to one technique, a copy of an object is made, where the copy includes all changes made prior to a particular point in time, and no changes made after the particular point in time. The copy is used to create a second object. Data that reflects the particular point in time is stored, and subsequently used to determine which changes should be applied to the second object. Data that indicates that the creation time of the second object is stored, and subsequently used to determine which changes should be applied to the original object.

24 Claims, 6 Drawing Sheets

U.S. PATENT DOCUMENTS

| | | | |
|---|---|---|---|
| 6,442,568 | B1 | 8/2002 | Velasco et al. |
| 6,453,354 | B1 | 9/2002 | Jiang et al. |
| 6,553,428 | B1 * | 4/2003 | Ruehle et al. .............. 719/330 |
| 6,691,155 | B1 | 2/2004 | Gottfried |
| 2001/0047270 | A1 | 11/2001 | Gusick et al. |
| 2003/0115274 | A1 | 6/2003 | Weber |
| 2003/0182328 | A1 | 9/2003 | Paquette et al. |
| 2003/0198214 | A1 | 10/2003 | Tsukakoshi et al. |
| 2003/0236823 | A1 | 12/2003 | Patzer et al. |
| 2003/0236834 | A1 | 12/2003 | Gottfried |

OTHER PUBLICATIONS

Kei Kurakawa et al., "Life Cycle Design Support Based on Environmental Information Sharing," IEEE, Feb. 1-3, 1999, Proceedings EcoDesign '99, First International Symposium, pp. 138-142.

Oliver Gunther, et al., "MMM: A Web-Based System for Sharing Statistical Computing Modules," IEEE, May-Jun. 1997, vol. 1, Issue 3, pp. 59-68.

Gunther, Oliver et al., "MMM: A Web-Based System For Sharing Statistical Computing Modules," May-Jun. 1997, IEEE, vol. 1 Issue 3, pp. 59-68.

Kurakawa, Kei et al., "Life Cycle Design on Environmental Information Sharing," Environmentally Conscious Design and Inverse Manufacturing 1999, Proceedings EcoDesign '99, Feb. 1999, IEEE, pp. 138-142.

Shiva, S.G., et al., "Modular Description/Simulation/Synthesis Using DDL," 19$^{th}$ Design Automation Conference 1982, IEEE Press, pp. 321-329.

Spiegler, Israel, "Automating Database Construction," ACM SIGMIS Database, vol. 14, Issue 3, Spring 1983, pp. 21-29.

IBM, "IBM® DB2® Universal Database, Replication Guide and Reference, *Version 7*," SC26-9920-00, 1994, 2000, Chapters 1, 4, and 6, 69 pages.

Sybase, "Sybase Replication Server, (v 12.0) Administration Guide," May 2002, Chapter 10, *Managing Subscriptions*, pp. 309-260.

* cited by examiner

INSTANTIATION OF OBJECTS FOR INFORMATION-SHARING RELATIONSHIPS

RELATED APPLICATIONS

This application is a continuation-in-part of and claims priority from the following applications, the content of each of which is incorporated herein in its entirety, for all purposes:

- U.S. patent application Ser. No. 10/308,924 now U.S. Pat. No. 6,889,231, entitled "ASYNCHRONOUS INFORMATION SHARING SYSTEM", by inventors BENNY SOUDER, DIETER GAWLICK, JIM STAMOS AND ALAN DOWNING, filed Dec. 2, 2002, which claims priority to U.S. Provisional Patent Application No. 60/400,532, filed on Aug. 1, 2002, entitled UTILIZING RULES IN DISTRIBUTED INFORMATION SHARING; and to U.S. Provisional Patent Application No. 60/410,883, filed Sep. 13, 2002, entitled ORACLE STREAMS;
- U.S. patent application Ser. No. 10/308,879, now U.S. Pat. No. 6,762,872 entitled "IN MEMORY STREAMING WITH DISK BACKUP AND RECOVERY OF MESSAGES CAPTURED FROM A DATABASE REDO STREAM", by inventors NIMAR SINGH ARORA and JIM STAMOS, filed Dec. 2, 2002, which claims priority to U.S. Provisional Patent Application No. 60/400,532, filed on Aug. 1, 2002, entitled UTILIZING RULES IN DISTRIBUTED INFORMATION SHARING; and to U.S. Provisional Patent Application No. 60/410,883, filed Sep. 13, 2002, entitled ORACLE STREAMS; and
- U.S. patent application Ser. No. 10/308,851, now pending entitled "REPLICATING DDL CHANGES USING STREAMS", by inventors MAHESH SUBRAMANIAM, filed Dec. 2, 2002, which claims priority to U.S. Provisional Patent Application No. 60/400,532, filed on Aug. 1, 2002, entitled UTILIZING RULES IN DISTRIBUTED INFORMATION SHARING; and to U.S. Provisional Patent Application No. 60/410,883, filed Sep. 13, 2002, entitled ORACLE STREAMS.

This application also incorporates by reference the content in its entirety of each of the following applications:

- U.S. Provisional Patent Application No. 60/400,532, filed on Aug. 1, 2002, entitled UTILIZING RULES IN DISTRIBUTED INFORMATION SHARING; and
- U.S. Provisional Patent Application No. 60/410,883, filed Sep. 13, 2002, entitled ORACLE STREAMS.

FIELD OF THE INVENTION

The present invention relates to information sharing systems and, more specifically, to instantiating objects that are to be involved in an information sharing relationship.

BACKGROUND OF THE INVENTION

Systems have been developed to enable the propagation and management of data, transactions and events in a data stream either within a database, or from one database to another. For example, such a system is described in U.S. patent application Ser. No. 10/308,924 now U.S. Pat. No. 6,889,231 entitled "Asynchronous Information Sharing System", filed on Dec. 2, 2002 by Benny Souder, Dieter Gawlick, Jim Stamos, Alan Downing.

In such systems, a data stream may be used to route published information to subscribed destinations. The information sharing may be unidirectional, bi-directional, or may involve numerous unidirectional and bi-directional information sharing relationships between numerous entities. The result is a new feature that provides greater functionality and flexibility than traditional solutions for capturing and managing events, and sharing the events with other databases and applications.

Typically, before information sharing relationship can begin operation, certain preliminary setup operations must be performed. For example, when the information sharing relationship is between database objects that reside in different databases, one issue in the setup and administration of such an information sharing system is how to "copy" database objects located at a source database to destination databases that are interested in the changes to these objects. In some cases, the objects may already exist at these destination databases. In other cases, it does not and needs to be created.

Another issue arises when the copy of the database object is taken at some point-in-time in the past. Specifically, in order to be consistent with the source object, changes that have occurred since the copy is taken need to be applied at the destination site. However, care must be taken to avoid reapplying changes that are already reflected in the copy.

The process of making consistent copies of database objects at destination databases is referred to herein as "instantiation". It is desirable to perform instantiation in a manner that is efficient and accurate, but which does not place a heavy burden on the administrator of the system. Specifically, it is desirable to perform instantiation without locking the source object for the duration of the instantiation operation. Further it is desirable to provide an instantiation technique that is flexible enough to take advantage of a wide variety of export mechanisms, such as pluggable/transportable tablespaces.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
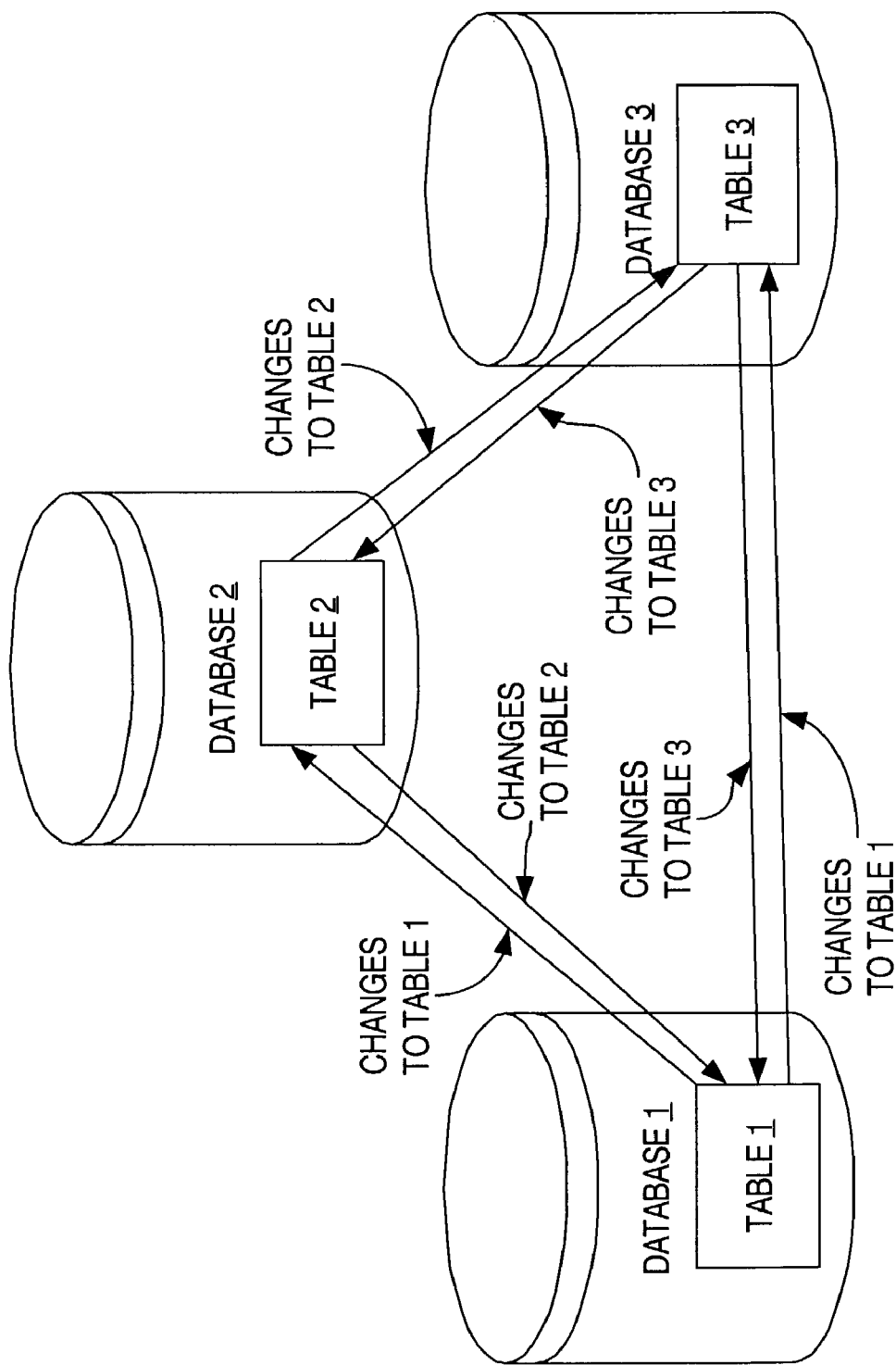
FIG. 1 is a block diagram in which three instances of a table are involved in bi-directional information sharing relationships relative to each other.

A method and apparatus for instantiating objects that are to be involved in an information sharing relationship is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Terminology

When one object that is to be in an information sharing relationship is created from another object, the object that is created is referred to as the "target object". The object from which the target object is created is referred to as the "source object".

The system in which the source object resides is referred to as the "source system". When the source system is a database management system, the source object will typically reside in a "source database".

The system in which the target object resides is referred to as the "target system". When the target system is a database management system, the target object will typically reside in a "target database".

Overview

Techniques are described herein for instantiating objects in a manner that does not require source objects to be locked for extended periods of time. For the purpose of explanation, examples shall be given in which the objects that will be involved in information sharing relationships are tables. However, the techniques are not limited to any particular type of object.

According to one embodiment, a copy of a source object is made as of a particular point in time, referred to herein as the "copy-creation time". Specifically, all changes made permanent to the source object prior to the copy-creation time are reflected in the copy, and no changes made permanent to the source object after the copy-creation time are reflected in the copy. A record is made of the copy-creation time associated with the copy.

The copy of the source object is used to create a target object in a target database. The copy-creation time is communicated to the target database. After the target object has been created, the target system then uses the copy-creation time to determine whether changes made to the source object in the source system should be applied to the target object.

Logical Clocks

Typically, a database system will use values from a logical clock to impose a sequence to the changes that it makes. By assigning values from the logical clock to changes, the database system keeps a record of the sequence of the operations. For example, if changes made by a first operation are assigned a time 12, and changes made by a second operation are assigned a time 54, it is known that the second operation was performed after the first operation.

Typically, each database system uses its own logical clock. Frequently, the logical clocks used by different database systems will not be in sync. Therefore, the sequence of a first change made in one system and a second change made in another system cannot be ascertained by comparing the respective time values associated with the changes.

As mentioned above, the instantiation of a target object involves communicating the copy-creation time of the copy from the source system to the target system. According to one embodiment, the copy-creation time of the copy is established relative to the logical clock used by the source system. Consequently, when communicated to the target system, the copy-creation time will typically have no meaning relative to the logical clock of the target system.

In embodiments where the logical clock of the source database system is used to establish the copy-creation time, the target database system needs to compare the copy-creation time with other time values from the source system. According to one embodiment, the source system communicates, along with the changes made at the source database, time values associated with those changes. The time values associated with the changes made in the source database (the "change times") are relative to the logical clock used by the source database. Consequently, when the target database system compares the copy-creation time with the change times associated with the changes from the source system, the target system is comparing values generated by the same logical clock (the logical clock of the source system). Since values from the same logical clock accurately reflect the sequence of the events to which they correspond, based on those values the target system is able to discard the changes from the source database that occurred before the copy-creation time, and apply to the target object the changes from the source database that occurred after the copy-creation time.

Operational Overview

According to one embodiment, instantiation involves "registering" the source table for instantiation. In one embodiment, the process of registering the source table for instantiation involves (1) briefly locking the table to ensure that there are no long-running transactions that hold modification locks on the table, and (2) writing metadata to a metadata table in the source database. As shall be described in greater detail below, this metadata is picked up by the mechanism that is used to make a copy of the source object (the "copy mechanism").

Once the source table is registered, the copy mechanism is used to make a copy of the source object. The copy reflects all changes made permanent to the source object as of a particular time, and no changes that were made permanent to the source object after that particular time. Because the source table is not locked during the copy operation, at the time that the copy operation is completed, the source table may actually contain many changes that are not reflected in the copy.

Any one of a variety of copy mechanisms may be used to make the copy. Copy mechanisms capable of performing a copy as of a particular point in time include, but are not limited to, export tools, Recovery Manager ("RMAN") utilities, and utilities for exporting pluggable/transportable tablespaces. The techniques described herein are not limited to any particular type of copy mechanism.

Along with making the copy of the source object, the copy-creation time associated with the copy is recorded. According to one embodiment, the copy-creation time information is placed at a location accessible to the tools that will be used to import the copy into the target database. The copy-creation time information may be placed, for example, within the same external file that holds the copy of the source object.

At the target database, the target object is created based on the copy. The tool used to create the target object from the copy may be any one of a number of tools that can be used for this purpose. For example, the target object may be created using an import tool, an RMAN utility, or a mechanism for importing pluggable/transportable tablespaces.

In addition to creating the target object, the copy-creation time associated with the copy is stored in the target database, along with data that associates the copy-creation time with the target object. According to one embodiment, a metadata table is used to store (1) the copy-creation time associated with the target object, (2) information that identifies the source database, and (3) information that identifies the source object.

After the target object is created and the copy-creation time is stored, the target system is ready to begin applying to the target object changes originally made to the source object. As the target system receives changes from the source system, the target system identifies the changes that are (1) from the source database, (2) made to source object. The target system then compares the change time associated with the changes with the copy-creation time associated with the target object. If the copy-creation time is more recent than the change time, then the corresponding change is not applied to the target object. On the other hand, if the change time is more recent than the copy-creation time, then the corresponding change is applied to the target object.

Instantiation Example

For the purpose of explanation, it shall be assumed that a user wishes to set up the information sharing relationships illustrated in FIG. 1. Referring to FIG. 1, there are three databases 1, 2 and 3, which respectively include tables 1, 2 and 3. Each of tables 1, 2 and 3 is in a bi-directional information sharing relationship with the other two tables. Thus, changes made to table 1 in database 1 are sent to databases 2 and 3 to be applied to tables 2 and 3. Similarly, changes made to table 2 in database 2 are sent to databases 1 and 3, and changes made to table 3 in database 3 are sent to databases 1 and 2.

Figure 2:
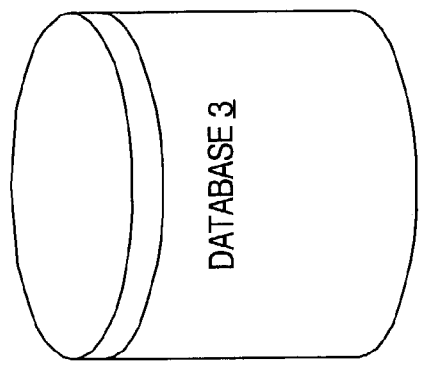
FIG. 2 is a block diagram that illustrates the system of FIG. 1 prior to the set up of the information sharing relationship.
Figure 2:
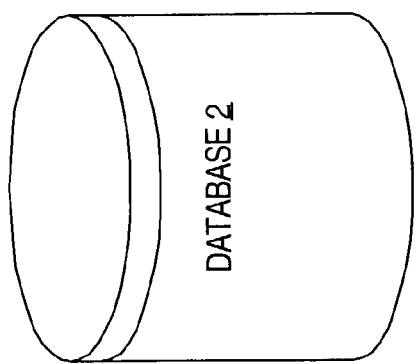
Figure 2:
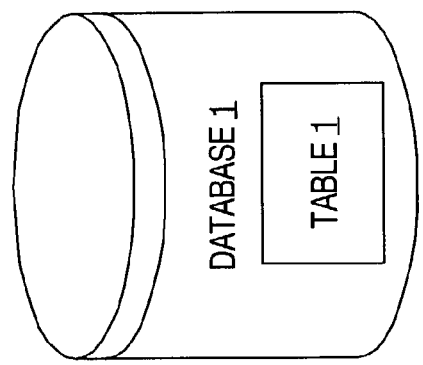

For the purpose of explanation, it shall be assumed that table 1 exists prior to the information sharing arrangement, and that tables 2 and 3 must be instantiated based on table 1. Thus, the system will initially appear as illustrated in FIG. 2.

According to one embodiment, the source object is "prepared" for export by making calls to various "preparation routines". According to one embodiment, one such call causes the database server that manages database 1 to register table 1 for participation in an information sharing relationship. During the registration process, "registration data" is stored within database 1. The registration data indicates that table 1 will be involved in an information sharing relationship. Another of the preparation calls may cause table 1 to be briefly locked, to ensure that no long-standing transactions have locks on table 1 that would hinder the instantiation operation.

After the preparation phase, a copy mechanism is used to generate a copy of table 1. As mentioned above, there are a variety of tools that provide a variety of modes for copying an object as of a particular time. For example, an export utility may be used in any one of a variety of read-consistent modes (e.g. CONSISTENT, OBJECT_CONSISTENT, FLASHBACK_SCN, FLASHBACK_TIME) to create a copy of table 1 that reflects all changes made prior to a particular time, and that does not reflect any changes made after the particular time. Read consistent modes also allow the copy creation time to be derived. In some systems, use of a read-consistent mode is only needed for export of partitioned tables, while a consistent copy of non-partitioned tables may be produced without the use of a read-consistent mode.

According to one embodiment, the copy mechanism first determines whether the object that is to be copied is associated with any registration data. If the object that is to be copied is associated with registration data, then the copy-creation time of the copy must be recorded. According to one embodiment, the registration data indicates a routine for the copy mechanism to call, where the specified routine causes the copy-creation time to be recorded in the same dump file that is used to store the copy of the source object.

As mentioned above, the copy-creation time associated with the copy is typically a value that is based on the logical clock of the source system. In the present example, the copy-creation time associated with the copy of table 1 is a value that is based on the logical clock used by the system that manages database 1. For the purposes of explanation, it shall be assumed that the copy-creation time associated with making the copy of table 1 is 50.

According to one embodiment, the copy mechanism places the copy-creation time information at a location accessible to the mechanism that will be used to create the target object from the copy. For example, if the copy mechanism is an export tool that creates copy 302 (see FIG. 3) in the form of a dump file, then the copy mechanism may store the copy-creation information in the dump file. According to one embodiment, the information placed in the dump file indicates a routine for the import mechanism to call. For example, the dump file may indicate a particular routine, and parameter values to pass to the particular routine, that will cause the copy-creation information to be stored in a metadata table in the target database.

Once the copy has been made, an import mechanism is used to create a target object in the target system based on the copy. Typically, the import mechanism used to create the target object will be based on the particular export mechanism used to export the source object. In some embodiments, a single tool or mechanism may be used to perform both the export and the import operations. The techniques described herein are not limited to the use of any particular type of export and import mechanism.

Figure 3:
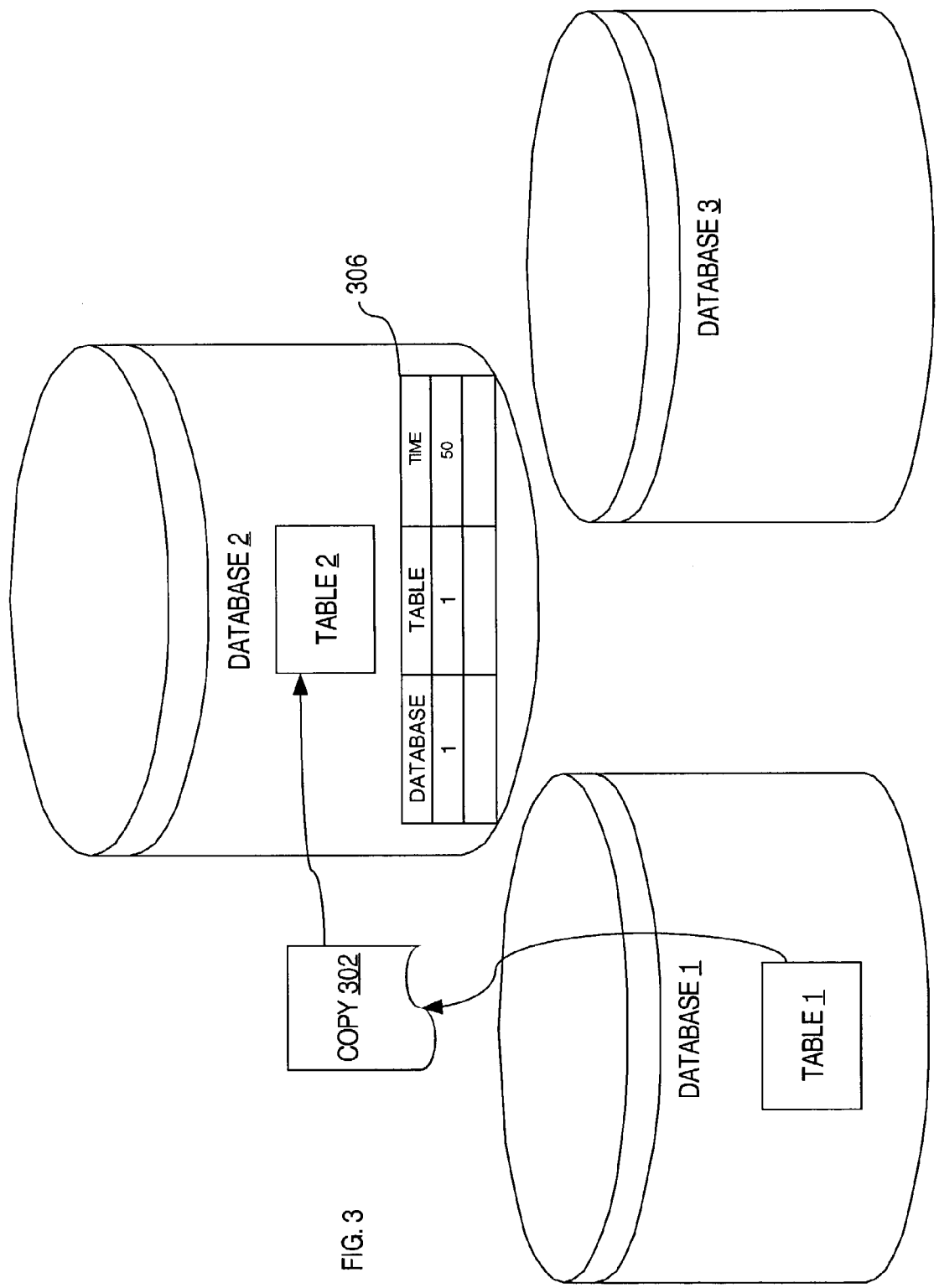
FIG. 3 is a block diagram that illustrates the system of FIG. 2 where a copy of the original table is being used to create a target table.

In the present example, it shall be assumed that an import utility is used to create table 2 in database 2 based on a copy 302 of table 1. The results of such an import operation are illustrated in FIG. 3. According to one embodiment, a parameter, such as STREAMS_INSTANTIATION=Y, can be provided to the import mechanism to indicate that the target object that is being created in the import operation will be part of an information sharing relationship. In response to this indication, the import utility records the copy-creation time in the metadata for the target object. In one embodiment, the import utility records the copy creation information by calling a routine identified in the dump file, using parameter values identified in the dump file.

In the illustrated example, the import utility calls a routine that stores a row in a metadata table 306 associated with table 2. The row that has been added to metadata table 306 indicates the source database, the source table, and the copy creation time of 50. Typically the source table 1 and the target table 2 will have the same name. However, with certain configurations, changes from table 1 could be mapped to table 2 of a different name. The change records associated with table 1 that arrive at database 2 are identified by the source information, rather than the destination information. Note that the time value 50 is relative to the logical clock associated with database 1, rather than the logical clock associated with database 2. In addition, the import utility creates table 2 and populates table 2 with data from the copy 302 of table 1.

In the present example, the information sharing relationship between table 1 and table 2 is bi-directional. Therefore, it is important to know the time, relative to the logical clock associated with database 2, that table 2 was created. The local time at which a target object is created is referred to herein as the local-creation-time of the object. For the purpose of explanation, it shall be assumed that the local-creation-time of table 2 is 35.

According to one embodiment, the local-creation-time of table 2 is sent from database 2 to database 1. Database 1 stores the local-creation-time of table 2 in a metadata table 304 (FIG. 4) associated with table 1. Knowledge of the local-creation-time of table 2 is important to database 1 because, due to the bi-directional nature of the information sharing relationship with table 2, database 1 will be receiving changes made directly to table 2. Because there were no changes to table 2 that occurred prior to the local-creation-time of table 2, no changes from database 2 prior to the local-creation-time have to be applied to table 1. On the other hand, all changes made to table 2 after the local-creation-time must be applied to table 1 to keep table 1 in sync with table 2.

Figure 4:
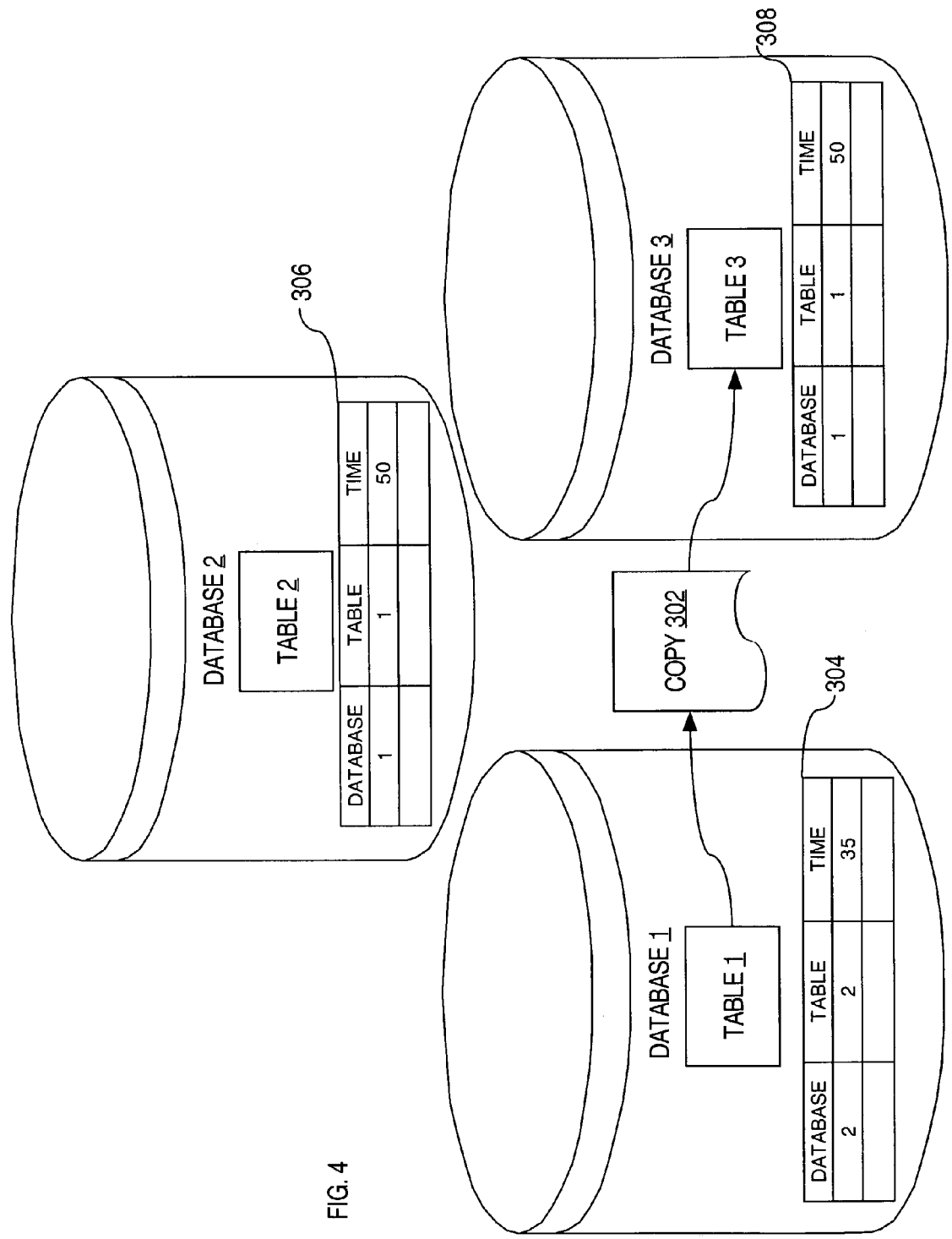
FIG. 4 is a block diagram that illustrates the system of FIG. 3 where a copy of the original table is being used to create a second target table.

FIG. 4 illustrates the local-creation-time of table 2 stored in metadata table 304 within database 1. In addition, FIG. 4 also illustrates the creation of table 3 in database 3 based on the same copy 302 of table 1 that was used to create table 2. The creation of table 3 involves the same operations that have been described above for table 2, except that table 1 does not have to be exported from database 1 a second time. Upon creating table 3 based on copy 302, the import mechanism stores in metadata table 308 the copy-creation time associated with copy 302.

According to one embodiment, the local-creation-time of a target object that participates in a bi-directional information sharing relationship is communicated to all other bi-directional participants. Thus, the local-creation-time of table 3 is communicated to both database 1 and database 2. Likewise, the local-creation-time of table 2 is communicated to both database 1 and database 3. After all of the local-creation-times have been shared among the participants in the relationship, the system will appear as illustrated in FIG. 5.

At this point, each participant has the information that it needs to determine which changes from the other participants should be applied, and which should be discarded. Specifically, all changes made to table 2 after time 35, and all changes made to table 3 after time 512, are applied to table 1. Similarly, all changes made to table 1 after time 50, and all changes made to table 3 after time 512, are applied to table 2. Likewise, all changes made to table 1 after time 50, and all changes made to table 2 after time 35, are applied to table 3.

Figure 5:
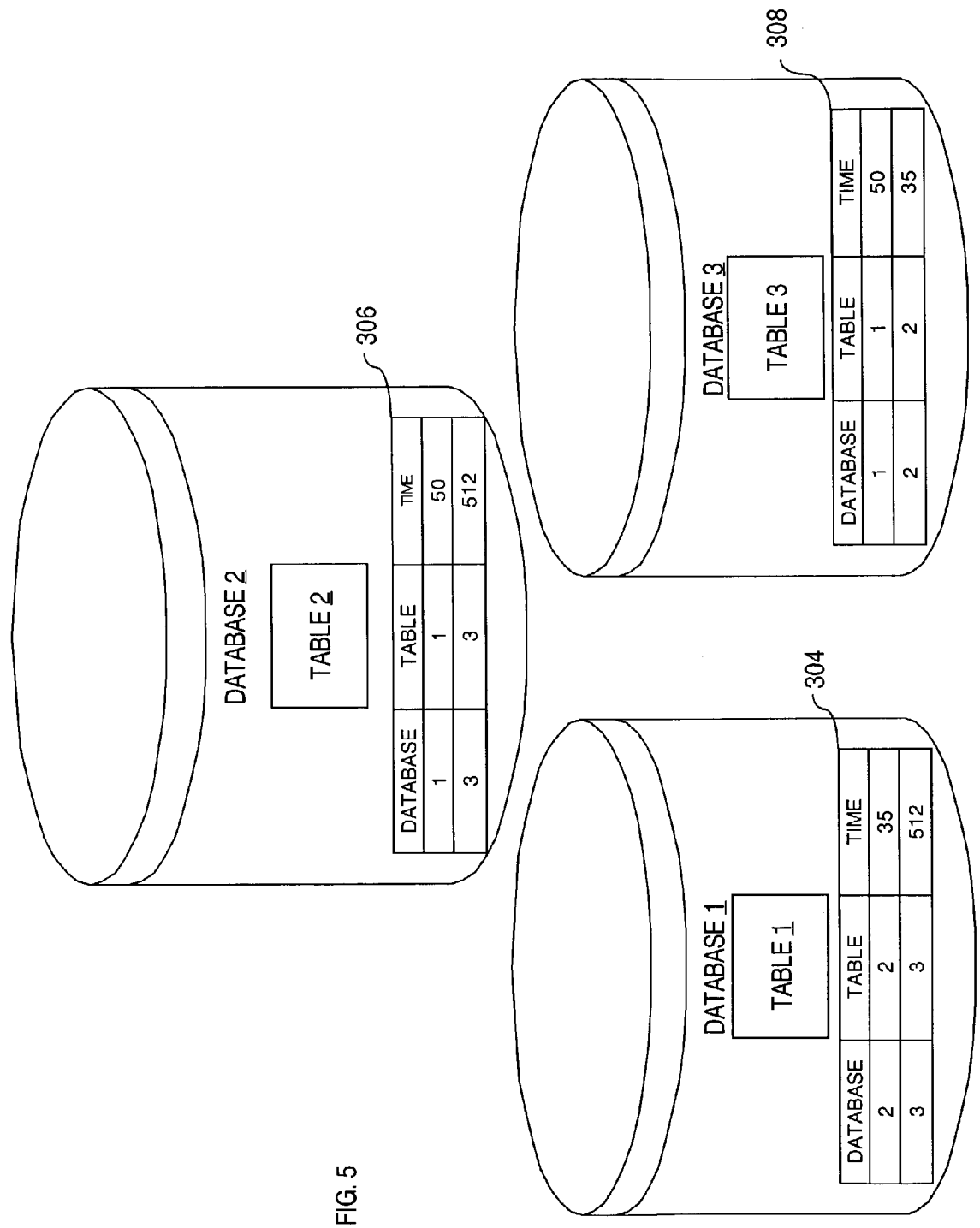
FIG. 5 is a block diagram that illustrates the system of FIG. 4 where copies of the table, and corresponding metadata, have been established at the databases that are to participate in the information sharing relationship.

In the example illustrated in FIG. 5, tables 2 and 3 are created based on the same copy 302. However, the present techniques apply equally to situations in which the target tables are made based on different copies of the original table. For example, table 3 may be created based on a copy of table 1 that has a copy-creation time of 23. Under these conditions, the metadata table 308 in database 3 would specify a copy-creation time of 23 for table 1, while the metadata table 306 in database 2 specifies a copy-creation time of 50 for table 1.

Information-Sharing Objects

In the examples given above, the objects that are participating the in the information sharing relationship are tables. However, tables are merely one example of objects that can share information in this manner. For example, the objects involved in an information-sharing relationship may be entire schemas, involving many tables. The objects may even be entire databases.

According to one embodiment, before a target table is created in a particular schema of a target database, the target system makes a call to share information between the particular schema and corresponding schemas in the databases that will participate in the information sharing relationship. Various benefits result from setting up an entire schema or database for information-sharing in this manner, including simplifying the instantiation process for a bi-directional setup by automatically recording the local creation time at all other sites when importing the object copies. For example, prior to creating target table 2, the database server for database 2 may register the schema that will contain table 2 in an information sharing relationship between databases 1 and 3. Consequently, when table 2 is created in the schema during the import operation, change records that are based on the data definition language (DDL) commands to create table 2 will be shared with databases 1 and 3. The time values associated with those change records indicate the local-creation time of table 2. Consequently, databases 1 and 3 can use the information from the DDL change records to obtain the local-creation time of table 2, which databases 1 and 3 respectively store in metadata tables 304 and 308.

Similarly, prior to creating target table 3, the database server for database 3 may register the schema that will contain table 3 in an information sharing relationship between databases 1 and 2. Consequently, when table 3 is created in the schema during the import operation, change records that are based on the data definition language (DDL) commands to create table 3 will be shared with databases 1 and 2. Databases 1 and 2 can use the information from the DDL change records to obtain the local-creation time of table 3, which databases 1 and 2 respectively store in metadata tables 304 and 306.

Hardware Overview

Figure 6:
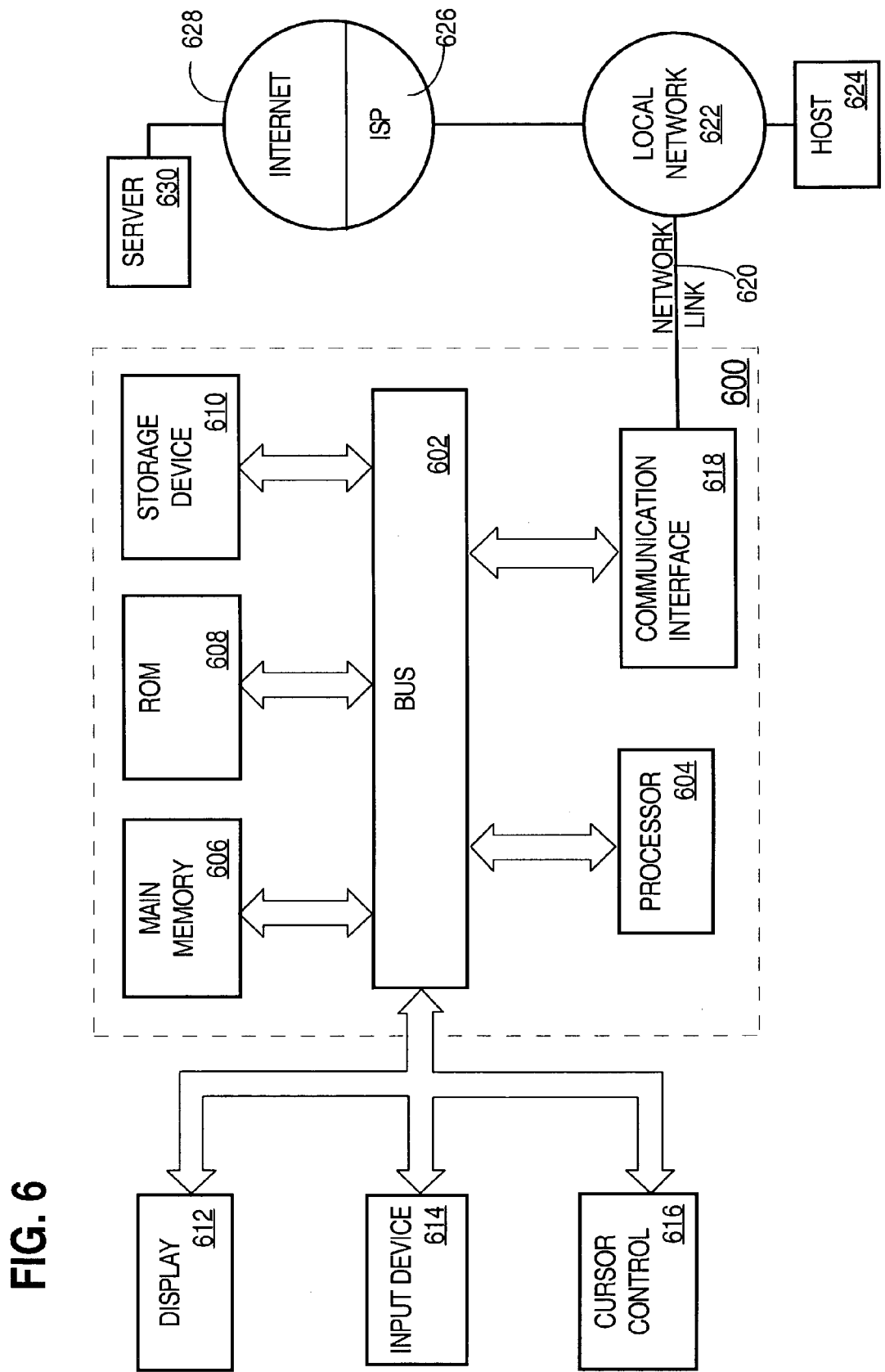
FIG. 6 is a block diagram of a computer system upon which embodiments of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for instantiating objects that are to participate in an information sharing relationship, the method comprising the steps of:
    making a copy of a first object residing in a first system;
    allowing changes to be made to said first object while said copy is being made;
    wherein said copy reflects all changes made permanent to said first object up to a particular point in time, and no changes made permanent to said first object after said particular point in time;

recording data indicating said particular point in time;

creating a second object in a second system based on said copy of said first object;

causing data indicating certain changes made in said first system to said first object to be sent to said second system;

wherein said data indicating certain changes includes data indicating a time at which said certain changes made in said first system were made permanent in said first system; and in said second system, determining whether to apply said certain changes made in said first system to said first object to said second object based on a comparison between the time indicated for the changes and said particular point in time.

2. The method of claim 1 wherein the first system and the second system are the same system.

3. The method of claim 1 further comprising the step of registering said first object for instantiation, wherein the step of registering includes:

briefly locking the first object to ensure there are no long-running transactions holding modification locks on the first object; and writing metadata to a metadata table in a source database in which the first object resides.

4. The method of claim 1 further comprising the step of storing in said second system a record indicating said particular point in time.

5. The method of claim 1, wherein said second object is created at a second particular point in time, the method further comprising the steps of:

sending from said second system to said first system data indicating said second particular point in time;

causing second data indicating changes made in said second system to said second object to be sent to said first system;

wherein said second data includes data indicating the time at which said changes made in said second system were made permanent in said second system;

in said first system, determining whether to apply changes made in said second system to said second object to said first object based on a comparison between the time indicated for the changes and said second particular point in time.

6. The method of claim 1 wherein:

the step of making a copy of a first object residing in a first system includes making a copy of a first database table residing in a first database;

the step of allowing changes to be made to said first object while said copy is being made includes allowing changes to be made to said first database table while said copy is being made;

the step of creating a second object in a second system based on said copy of said first object includes creating a second database table in a second database;

the step of causing data indicating changes made in said first system to said first object to be sent to said second system includes causing data indicating changes made to said first table to be sent from a first database server managing said first database to a second database server managing the second database; and the step of determining whether to apply changes includes the second database server performing a comparison between the time indicated for the changes and said particular point in time.

7. The method of claim 1 wherein:

the first system is a first database system;

the first object is a first database object;

the second system is a second database system; and the step of making a copy is performed by exporting said first database object.

8. The method of claim 1 wherein:

the first system is a first database system;

the first object is a first database object;

the second system is a second database system; and the steps of making a copy and creating said second object are performed by transporting a pluggable tablespace containing said first database object from said first database system into said second database system.

9. The method of claim 1 wherein:

the first system is a first database system;

the first object is a first database object;

the second system is a second database system; and the step of making a copy is performed using a recovery manager utility.

10. The method of claim 1 wherein:

the first system maintains a first logical clock to indicate a sequence to changes within the first system; and the step of recording data indicating said particular point in time includes recording said particular point in time relative to said first logical clock.

11. The method of claim 5 wherein:

the first system maintains a first logical clock to indicate a sequence to changes within the first system;

the step of recording data indicating said particular point in time includes recording said particular point in time relative to said first logical clock;

the second system maintains a second logical clock to indicate a sequence to changes within said second system; and the step of sending from said second system to said first system data indicating said second particular point in time includes sending data indicting said second particular point in time relative to said second logical clock.

12. The method of claim 5 wherein the step of sending from said second system to said first system data indicating said second particular point in time includes:

prior to creating said second object, establishing an information sharing relationship between said first system and said second system;

based on said information sharing relationship, sending to the first system change records from said second system reflecting creation of the second object; and the first system determining said second particular point in time based on said change records.

13. A computer-readable medium carrying one or more sequences of instructions which, when executed by one or more processors, causes the one or more processors to perform the method recited in claim 1.

14. A computer-readable medium carrying one or more sequences of instructions which, when executed by one or more processors, causes the one or more processors to perform the method recited in claim 2.

15. A computer-readable medium carrying one or more sequences of instructions which, when executed by one or more processors, causes the one or more processors to perform the method recited in claim 3.

16. A computer-readable medium carrying one or more sequences of instructions which, when executed by one or more processors, causes the one or more processors to perform the method recited in claim 4.

17. A computer-readable medium carrying one or more sequences of instructions which, when executed by one or more processors, causes the one or more processors to perform the method recited in claim 5.

18. A computer-readable medium carrying one or more sequences of instructions which, when executed by one or more processors, causes the one or more processors to perform the method recited in claim 6.

19. A computer-readable medium carrying one or more sequences of instructions which, when executed by one or more processors, causes the one or more processors to perform the method recited in claim 7.

20. A computer-readable medium carrying one or more sequences of instructions which, when executed by one or more processors, causes the one or more processors to perform the method recited in claim 8.

21. A computer-readable medium carrying one or more sequences of instructions which, when executed by one or more processors, causes the one or more processors to perform the method recited in claim 9.

22. A computer-readable medium carrying one or more sequences of instructions which, when executed by one or more processors, causes the one or more processors to perform the method recited in claim 10.

23. A computer-readable medium carrying one or more sequences of instructions which, when executed by one or more processors, causes the one or more processors to perform the method recited in claim 11.

24. A computer-readable medium carrying one or more sequences of instructions which, when executed by one or more processors, causes the one or more processors to perform the method recited in claim 12.

* * * * *